United States Patent
Wilson

(10) Patent No.: US 9,553,482 B2
(45) Date of Patent: Jan. 24, 2017

(54) LIGHTING POWER SUPPLY

(71) Applicant: TRIDONIC UK LTD, Chineham Basingstroke (GB)

(72) Inventor: Ian Wilson, East Herrington Sunderland (GB)

(73) Assignee: TRIDONIC US LTD, Chineham Basingstoke (GB)

( * ) Notice: Subject to any disclaimer, the term of this patent is extended or adjusted under 35 U.S.C. 154(b) by 0 days.

(21) Appl. No.: 14/376,207

(22) PCT Filed: Feb. 1, 2013

(86) PCT No.: PCT/EP2013/052062
§ 371 (c)(1),
(2) Date: Aug. 1, 2014

(87) PCT Pub. No.: WO2013/113888
PCT Pub. Date: Aug. 8, 2013

(65) Prior Publication Data
US 2015/0008844 A1    Jan. 8, 2015

(30) Foreign Application Priority Data
Feb. 3, 2012 (GB) .................................. 1201901.4

(51) Int. Cl.
*H05B 37/02* (2006.01)
*H02J 9/02* (2006.01)
*H05B 41/285* (2006.01)
*H05B 41/292* (2006.01)

(52) U.S. Cl.
CPC ............. *H02J 9/02* (2013.01); *H05B 37/0254* (2013.01); *H05B 37/0263* (2013.01); *H05B 41/2853* (2013.01); *H05B 41/2923* (2013.01); *Y10T 307/625* (2015.04)

(58) Field of Classification Search
CPC ....................................................... H05B 37/02
USPC ............. 315/291, 307, 246, 247, 312, 185 R
See application file for complete search history.

(56) References Cited

U.S. PATENT DOCUMENTS

| | | | |
|---|---|---|---|
| 2006/0125426 A1* | 6/2006 | Veskovic et al. | 315/312 |
| 2006/0202851 A1* | 9/2006 | Cash et al. | 340/825.69 |
| 2007/0273307 A1* | 11/2007 | Westrick et al. | 315/312 |
| 2008/0179968 A1 | 7/2008 | Szabados et al. | |
| 2011/0080102 A1* | 4/2011 | Ge et al. | 315/200 R |
| 2011/0210681 A1* | 9/2011 | Barth | 315/276 |
| 2011/0222314 A1* | 9/2011 | Liu et al. | 363/15 |

FOREIGN PATENT DOCUMENTS

| | | |
|---|---|---|
| DE | 102008017557 A1 | 10/2009 |
| EP | 1578176 A2 | 9/2005 |
| GB | 2365231 A | 2/2002 |

(Continued)

*Primary Examiner* — Minh D A
(74) *Attorney, Agent, or Firm* — Volpe and Koenig, P.C.

(57) ABSTRACT

Lighting power supply system (1) including a mains input converter (11) operable to provide power, a controller (17) operable to control at least one element of the lighting system, a controller bus (26) and a controller interface (25) operable to provide control signals from the bus to the lighting system. An auxiliary converter (43) powers the lighting system from the bus and it may allow the controller to continue to be powered when the mains input is absent and an emergency battery (19) is depleted.

16 Claims, 6 Drawing Sheets

(56) References Cited

FOREIGN PATENT DOCUMENTS

| WO | 2011124721 A1 | 10/2011 |
| WO | 2012174319 A1 | 12/2012 |
| WO | 2012174328 A2 | 12/2012 |

* cited by examiner

LIGHTING POWER SUPPLY

TECHNICAL FIELD

The present invention relates to a lighting system power supply arrangement including a mains input converter operable to provide power, a controller operable to control at least one element of the lighting system, a controller bus, and a controller interface operable to provide control signals from the bus to the controller. The present invention also relates to a lighting system power supply method.

BACKGROUND TO THE INVENTION

Various arrangements for lighting systems are known which provide both conventional and emergency lighting. Such emergency lighting is intended to be activated when the conventional lighting is no longer operative because the mains supply to the conventional lighting is no longer available or malfunctions. Emergency lighting is typically powered by a battery or other energy storage device. Conventional lighting is controlled by an on/off switch by means of which a user (or control system) can control whether the lighting is illuminated or not. Generally, emergency lighting is intended to be automatically illuminated when the absence of mains power or the malfunction of mains power for the conventional lighting is detected in some way. Emergency lighting may be used to allow escape from buildings that would otherwise be in darkness due to the inoperativeness of the conventional lighting.

Emergency lighting and conventional lighting may share components. For example, the same lamp (such as a gas discharge lamp or LED) and/or ballast may be used for both conventional and emergency lighting ("maintained mode"). Other components may also be shared.

A lighting system comprising emergency lighting and conventional lighting may be considered to have two operating modes. In a normal mode, when the direct mains supply is operating normally (within the normal voltage range), a switched mains input, controlled by an on/off switch, is monitored, and the lamp is illuminated or extinguished in dependence upon the switched mains input In an emergency mode, when the mains supply is not available or is malfunctioning (is outside the normal voltage range), the lamp is illuminated automatically, irrespective of the status of the switched mains input, using power from a battery or other storage element.

FIG. 1 shows the basic elements of such a known lighting system, designated generally at 1, which receives the switched mains input 3 and the direct AC mains input 5. The direct AC mains input 5 is filtered by input filter 7 (for harmonics, EMI, and power factor reasons) and rectified by rectifier 9 to which a SELV (Separated Extra Low Voltage) isolated DC-DC input converter 11 is connected The lighting system further comprises a light source driver 13 (e.g. electronic ballast) and a light source 15 (e.g. LED lamp) powered by the input converter 11.

An electronic controller 17 controls the operation of the lighting system, including activating emergency lighting when appropriate.

FIG. 1 further shows a battery 19 which provides power in an emergency situation. Battery power is applied to the driver 13 and light source 15 when the controller 17 detects the failure of the mains supply 5.

The same light source driver 13 is used both in the emergency mode and the normal mode to supply current to the lamp 15 in this example, although this is not essential.

The emergency mode is activated by the controller 17 when the direct mains input 5 is not available or malfunctions. The normal mode should be activated by the controller 17 when the direct mains 5 is present and operating correctly, and in this mode the lamp 15 is illuminated when the switched mains 3 is on. The voltage on the direct mains input 5 may be an AC voltage (e.g. 230V AC).

The controller 17 is powered by a controller supply 23, which itself is powered by the input converter 11. The controller supply 23 may be a Low Voltage Power Supply (LVPS). The controller 17 may be also powered from the battery 19.

When the direct mains input 5 is a normal AC mains signal the battery 19 is charged from the input converter 11 by battery charger 21 (via charger rail 46) under control of the controller 17.

In more detail, the input converter 11 receives the direct mains input voltage 5 and provides DC output to supply current to the light source driver 13 and battery charger 21. The switched mains input 3 is monitored either directly or indirectly by the controller 17. The controller 17 also determines whether or not the direct mains input 5 is operating normally.

When the controller 17 determines that the direct mains 5 is operating normally and that the switched mains input 3 is on, the electronic controller 17 activates the light source driver 13 to illuminate the lamp 15 and activates the battery charger to charge the battery 19.

When the controller 17 detects that the direct mains input 5 is not normal (emergency mode), the controller 17 activates the light source driver 13 using power from the battery 19 to illuminate the lamp 15 (irrespective of the status of the switched mains input 3).

When in the normal mode the electronic controller 17 may operate the light source driver 13 in a different manner to the emergency mode.

The controller 17 may determine the status of the switched live input 3 in any suitable manner. For example, it is known to apply the switched mains input 3 to a potential divider, and then to a voltage threshold detector with an isolation circuit, such as an opto-coupler. Typically, the mains input 3 is rectified by a rectifier before being applied to the voltage threshold detector and the isolation circuit. When the switched live input 3 is on, the output of the isolation circuit will be a pulsed signal, the presence of which can be detected by logic within the controller 17. When the switched live 3 input is off, the output of the isolation circuit will be a constant value (zero volts) and this can also be detected by logic of the controller 17. The controller 17 then operates the driver 13 and lamp 15 in accordance with the state of the switched mains input 3. The signal on the switched live input 3 which is interpreted as signal for the status of the emergency mode may have different shapes or states, depending on the definition of the system. A signal of zero volts as described above is just an example.

The lighting system 1 may comprise an interface 25, e.g. a DALI (Digital Addressable Lighting Interface), that is connected to a DALI bus 26, for intensity control (dimming) and/or for maintenance and service control. DALI is a communication protocol widely used in lighting systems. A two wire serial communication arrangement establishes a master/slave communication between a central DALI controller (not shown) and the lighting system controller 17 by setting low and high levels of voltages. Data is transferred between the DALI controller and lighting system controller, by means of an asynchronous, half-duplex, serial protocol over a two-wire differential bus, with a fixed data transfer rate of 1200 bit/s. The DALI data is transmitted using Manchester encoding. The protocol standard sets high levels as voltage differences higher than a range of 9.5V up to 22.5V between the two wires.

Low levels are set as voltage differences of less than 6.5V down to −6.5V (either positive or negative). According to the protocol the current supply for the DALI communication has to be limited to 250 mA.

Depending on the type of mains voltage detected on the direct mains input 5, the controller 17 may put the driver 13 into different operation modes, e.g. to illuminate the lamp 15 at a given intensity level. The different types of operation depending on the type of detected mains voltage may be also programmed in the controller 17 and may be changed (e.g. by the DALI controller) through an interface (e.g. DALI interface). For example the dimming range can be limited due to the detected type of mains voltage or a certain dimming level can be selected (e.g. in emergency mode).

The lighting system may additionally include a test switch (to exercise auto-test routines) and a status indicator LED 29, connected to the controller 17.

It is desirable that the controller 17 is continuously powered. If the controller 17 does not receive power it will shut down and it will not be possible for the controller 17 to react to input signals in order to provide the desired illumination of the lamp 15. Such input signals may include the switched live input 3, instructions from the DALI interface 25 and operation of test switch 27. The controller 17, if deactivated, will also not be able to perform mains detection to determine whether the AC mains supply 5 is present and operating as normal, and so will not be able to detect an emergency situation and illuminate the lamp 15 in an emergency mode.

When the direct mains input 5 fails or malfunctions, the controller 17 is powered by the battery 19. Initially, the battery 19 may be able to provide sufficient power to operate the controller 17. In emergency situations, current being drawn from the battery 19 after a discharge event (emergency mode occurrence during which the lamp 15 has been illuminated by battery power) may be limited to very low levels whilst the direct mains input is not present (or is malfunctioning). The quiescent current from the battery 19 may be at a very low level (for example less than 100 μA). A battery of the nickel metal hydride (NiMh) type or a battery of a different type having a sensitive chemistry has a limited current output.

The lighting system 1 may have a "rest mode" which enables, for example, the emergency lighting to be switched off during a mains failure after a time when the premises have been fully evacuated. This prevents full discharge of the battery 19 by constant illumination of a lamp 15 when this is no longer necessary. This assists reoccupation of the premises because it stops full discharge of batteries. However, in the "rest mode" the amount of power available from a battery 19 can reach a very low level as the "rest mode" can last long periods where no recharge happens and the battery slowly discharges through parasitics and self-discharge.

The low level of current available from the battery makes it difficult to keep the controller 17 operating when the direct mains input 5 is not available (or malfunctioning). To mitigate this difficulty technologies have been developed to allow the integrated circuits used for implementing the controller 17 to operate in lower power states. However, in some cases such measures are not sufficient to allow the controller 17 to continue operating throughout an emergency situation where the direct mains input 5 is unavailable (or malfunctioning). This, disadvantageously, results in loss of control of the lighting system.

In general, it is an object of the present invention to provide a convenient auxiliary power supply for a lighting system. Such an auxiliary power supply may, for example, be used to power the controller 17 so that the controller can remain operative when the current available from the battery 19 is significantly diminished. However, it should be appreciated that the object of the invention is to provide an auxiliary power supply for general use in a lighting system, and not just for powering a controller like the controller 17 described above.

SUMMARY OF THE INVENTION

In one aspect the present invention provides a lighting system power supply arrangement including a mains input converter operable to provide power, a controller operable to control at least one element of the lighting system, a controller bus, and a controller interface operable to provide control signals from the bus to the lighting system, characterised by an auxiliary converter operable to power the lighting system from the bus.

Generally, the mains input converter is operable to provide power to one or more elements of the lighting system. The mains input converter may provide power to a lamp, such as an LED or fluorescent lamp (or any other type of lamp). The mains input converter may additionally, or alternatively, charge an energy storage device such as a battery. The charging may be performed via a battery charger. Further, the mains input converter may additionally, or alternatively, power the controller.

The lighting system may comprise a lamp that is illuminated when mains power is available and operating correctly. When mains power is absent, or malfunctions, the lighting system may provide emergency lighting using the same or a different lamp.

One of the elements controlled by the controller may be the lamp. The controller may control the operation of a lamp in dependence upon the detected status of the mains input. For example, if the mains input is detected to be present and operating correctly, then the lamp may be illuminated in one particular way (such as a particular level of intensity). When the mains input is detected to be absent of malfunctioning, the controller may illuminate the lamp in a second state, such as a different level of brightness (such as a lower level of brightness).

The controller may control the operation of the lamp in dependence upon the control signals received from a central controller via the controller bus. Such a central controller may control a multiplicity of lighting systems.

The controller bus may carry power for the purpose of conveying the control signals. This is the conventional purpose of the power in a controller bus. According to embodiments of the invention, the auxiliary converter is operable to use this power advantageously to power the controller from the bus. This provides an additional source of power for the controller. This is advantageous when the mains power is absent and/or when the power of the energy storage device/battery is required to be perservered or is depleted (or for any other reason). The auxiliary converter may additionally, or alternatively, be operable to provide power to one or more elements of the lighting system, e.g. charge an energy storage device such as a battery.

The controller bus may be a DALI bus and the controller interface may be a DALI interface. The DALI standard is specified in IEC 60929 as well as in IEC 62386, which are hereby fully incorporated by reference. The DALI bus and DALI interface allow control of the lighting system from an appropriately configured central controller. The DALI bus is only one example for a bus system with active high transmission. Such active high transmission is characterized by the feature that there is a voltage level above zero when no data is transmitted. The invention can be applied to such bus systems with active high transmission.

In the embodiments the controller bus is powered independently of the mains input. The controller bus may be powered when the mains input is absent or malfunctioning. Thus, the controller bus provides a source of power that may be available when the mains input is unavailable or malfunctioning, and so provides an alternative source of power. Advantageously, the alternative source of power is available from an existing element of the lighting system (e.g. DALI bus) and so the expense of providing an additional energy source, specifically to back up the mains input is avoided. The controller bus may be backed up by a central battery where such battery can power the controller bus during a failure of the mains supply whereby the controller bus can be held active also in case of a mains outage.

The auxiliary converter may power the lighting system at any time, but may particularly advantageously do so when the mains input is outside normal operating values. Whether the mains input is outside normal values or not may be determined by the controller using a suitable monitoring circuit.

The auxiliary converter is preferably an isolated DC-DC converter.

Embodiments of the present invention may:

1. Provide power from the controller bus (e.g. DALI bus) to any part of a lighting system circuit (e.g. lamp ballast, LED driver, battery etc.) when required.

2. Provide power from the controller bus (e.g. DALI bus) to provide the lighting system controller (including a micro controller and its circuitry) when the mains input voltage is off and the battery is discharged (completely or partially).

3. Provide some amount of power from the controller bus (e.g. DALI bus) to supply the control circuitry, thereby avoiding too high quiescent currents leaking from the battery in low power states when there is a maximum allowed discharged current limit.

4. Provide a circuit able to supply the lighting system circuit with some amount of power from the controller bus (e.g. DALI bus).

5. Provide power to a lighting system that provides emergency lighting, particularly supplying the controller when the controller is operable to illuminate emergency lighting that has a "rest mode" of operation, when the battery is partially (almost completely) discharged or the emergency light is switched off to preserve power, thereby avoiding further discharge of the battery by preventing too high quiescent currents.

In a second aspect the present invention provides a lighting system power supply method as defined in the claims.

BRIEF DESCRIPTION OF THE DRAWINGS

For a better understanding of the present invention embodiments will now be described by way of example, with reference to the accompanying drawings, in which.

In the figures the same references signs are generally used to designate like elements.

DETAILED DESCRIPTION OF EMBODIMENTS OF THE INVENTION

Figure 1:
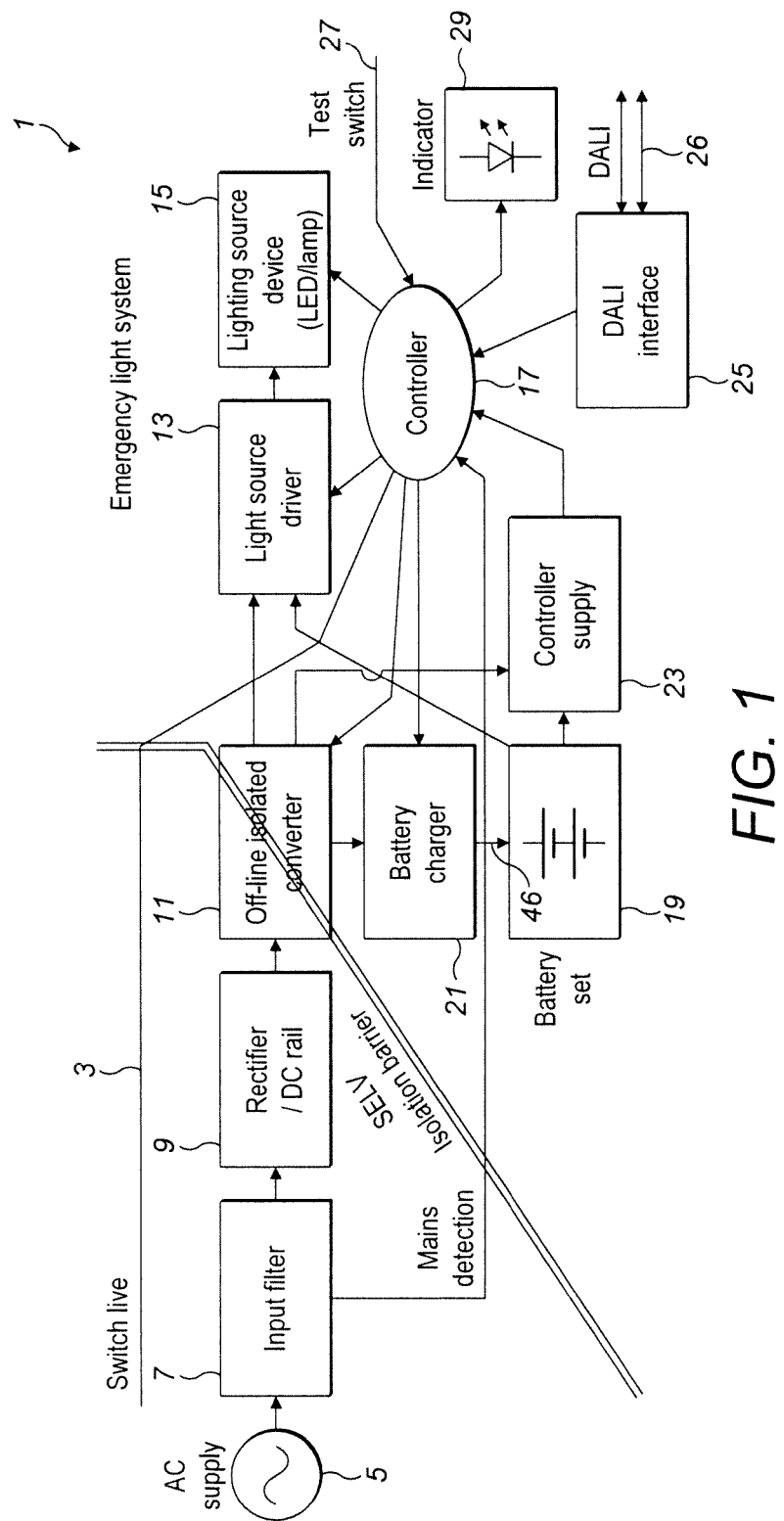
FIG. 1 shows the basic elements of a known lighting control system which can be powered by either an AC mains input or a DC input from a battery.
Figure 2:
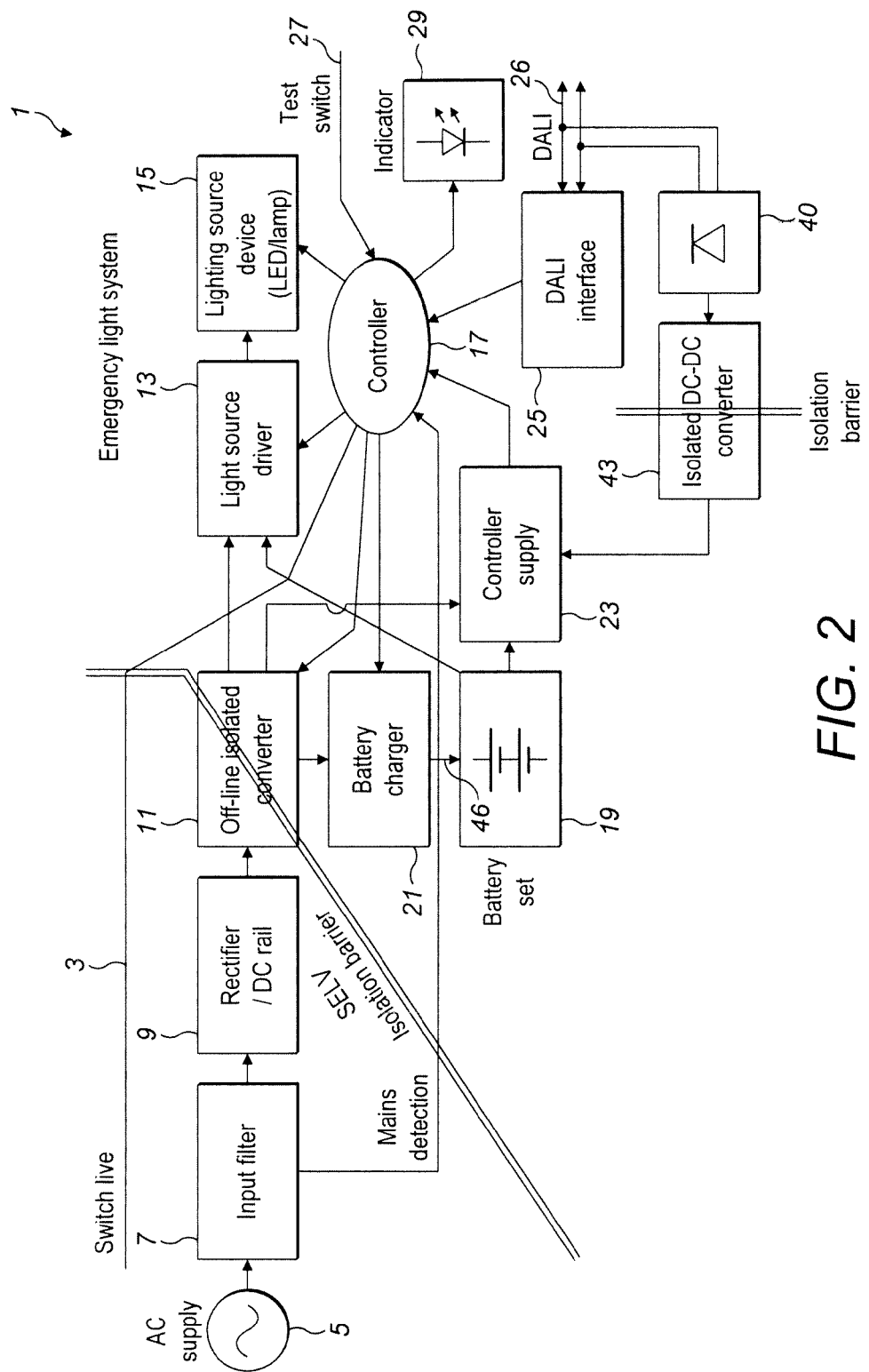
FIG. 2 shows a first embodiment to the invention which includes the elements of FIG. 1 and additionally includes an auxiliary converter for making power available from the controller bus (DALI bus) to the controller.

The basic elements of an embodiment of the invention are shown in FIG. 2. These comprise the elements of the lighting system of FIG. 1 (described above). However, according to the embodiment, to make power from the DALI bus 26 available to the controller 17 (via the controller supply 23), an isolated auxiliary DC-DC auxiliary converter 43 is provided which is coupled to the DALI bus via a (optional) rectifier 40.

As discussed above, conventionally, the DALI bus 26 is used to transmit control signals to/from the DALI interface in order to control various aspects of the lighting system 1 by means of the controller 17. According to the embodiment, the power available on the DALI bus 26 is used as a source of power for maintaining the controller 17 in a powered state—for example, in the event that power for the controller 17 is not available in other circumstances. However, it should be understood that the power from the DALI bus 26 may be provided to any part of the lighting system (for example, to the battery 19 or the driver 13 (or ballast) at a time when required). In the particular embodiment to be described in detail, the power from the DALI bus 26 is used to power the lighting system controller 17, particularly when the direct AC mains input 5 is interrupted (or malfunctions), and further particularly when battery 19 is discharged (completely or partially). By providing power from the DALI bus 26 to supply the controller 17, it is possible to lower the amount of power drawn from the battery 19 and/or avoid too high quiescent currents leaking from the battery 19 in low power states when there is a maximum allowed discharged current limit. In case where at least a part of the power supplied to the controller 17 is taken from the DALI bus 26 the amount of power taken from the battery 19 can be lowered and thus the depletion of the battery 19 can be slowed down. Power from the DALI bus 26 may particularly be supplied to the controller 17 when the lighting system 1 is in the "rest mode" of operation, when the battery 19 is partially (almost completely) discharged, thereby avoiding further discharge of the battery 19 by preventing too high quiescent currents. In the event of a "rest mode" power from the DALI bus 26 may be supplied to parts of the lighting circuit 1 and thereby reduce the amount of power supplied from the battery 19 to the lighting circuit 1 during "rest mode". The controller 17 may be configured to activate the auxiliary converter 43 when the rest mode is active.

The isolated DC-DC converter 43 provides electrical isolation between the DALI bus 26 and the rest of the lighting system 1. Several circuit options are possible to implement this feature. Examples given below use fly back and forward converters. However, it should be understood that any circuit capable of providing energy transfer from the DALI bus 26 to the rest of the lighting circuit 1 may be used in accordance with the principles of the invention.

The embodiments of the present invention, by using power available from the DALI bus 26, allow elements of the lighting system 1 to be powered even when the direct AC mains input 5 is interrupted (or malfunctions) and the battery 19 is discharged or otherwise unable to provide the required power. The DALI bus 26 provides a convenient already existing source of power that can be used advantageously, in accordance with the embodiments, additionally to power other elements of the lighting system 1. The alternative would be to provide power from a new, external source, with additional costs and complexity.

Power from the DALI bus 26 may be drawn in response to the lighting system 1 entering a rest-mode, in order to reduce the so called 'stand-by losses'. Also in case where the light is off the lamp driver should advantageously draw no power from the mains voltage input 5 (in this case, the battery charging from the mains voltage input 5 would increase the stand-by power consumption). When power is drawn from the DALI bus 26 this lowers the amount of power drawn from the mains voltage input 5 and thereby the so called 'stand-by losses' can be lowered.

Additional triggers for taking power from the DALI bus 26 may be the following. As the internal low voltage power supply 23 for the controller 17 may be coupled to the driver 13, this low voltage power supply would be deactivated as well when the lamp 15 is off. In the event of a mains failure (the DALI bus 26 might be powered by a battery backed up system) such powering of the battery by the DALI bus 26 would be also an advantage.

Figure 3:
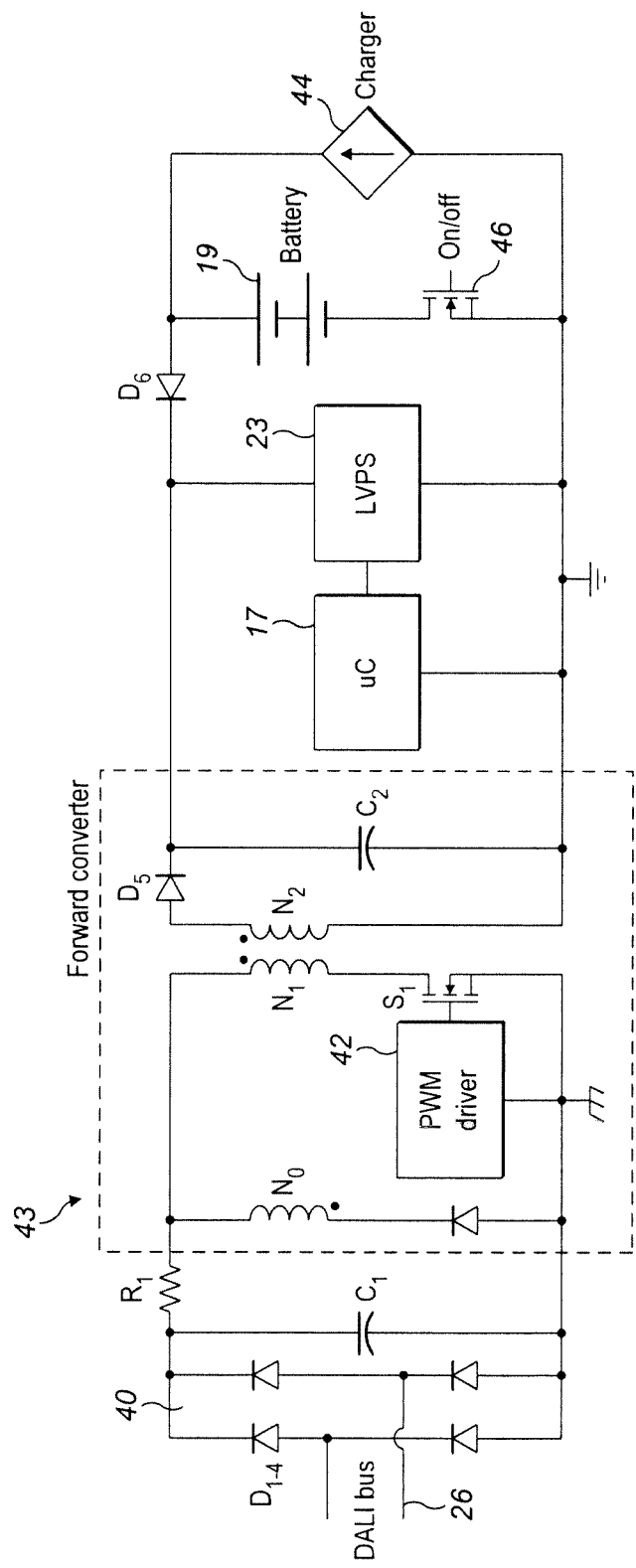
FIGS. 3 to 6 show circuits in which the auxiliary converter is implemented.

An isolated off battery DC-DC converter with an inductor-less forward converter circuit is shown in FIG. 3. The circuit is connected on the input side to the DALI bus 26 via bridge rectifier 40 across which capacitor $C_1$ is connected in order to provide power. The circuit includes the isolated DC-DC auxiliary converter 43 and the battery 19. The auxiliary converter 43 is constituted, in this example, by a so-called forward converter which exhibits, on the one hand, a transformer T with a primary winding N1 and a secondary winding N2 and also, on the other hand, a controllable switch S1 which is controlled by a PWM (Pulse Width Modulation) driver 42.

The battery rail represents the charging rail of the battery 19. The MOSFET switch 46 represents the reverse battery switch protection usually present in emergency applications. The LVPS 23 of the control circuitry (usually comprising a microcontroller and resistor dividers, etc.) is connected to this rail. The LVPS 23 is responsible for supplying the controller 17 and may be just a linear regulator or another DC-DC converter such as buck, boost, buck-boost, SEPIC (Single-Ended Primary Inductor Converter), etc. When mains AC supply is off, usually the LVPS 23 is directly supplied by the battery 19 through the connection of (optional) diode D6.

When battery 19 is discharged to a lower limit, the controller 23 enters a low power mode where it has a low power consumption and stops most of its functionalities.

According to the embodiment, energy from the DALI bus 26 is used to keep the controller 17 in operation. The rectifier 40 (D1-4) as a full wave rectifier rectifies the DALI bus voltage and thus makes the circuit insensitive to the polarity of the wiring. Resistor RI can be inserted to limit rush current of Cl. The DC-DC isolated converter 43 is connected to the DC rail from rectified DALI bus 26, to transfer power to the emergency control circuitry (LVPS 23 and controller 17). The forward converter 43 of FIG. 3 can be driven either from the primary winding $N_1$ or from the secondary winding $N_2$ or even with some feed-back using an opto-coupler. By operating the switch S1, the transformer T is charged from DALI DC rail and discharged to the battery rail.

Figure 4:
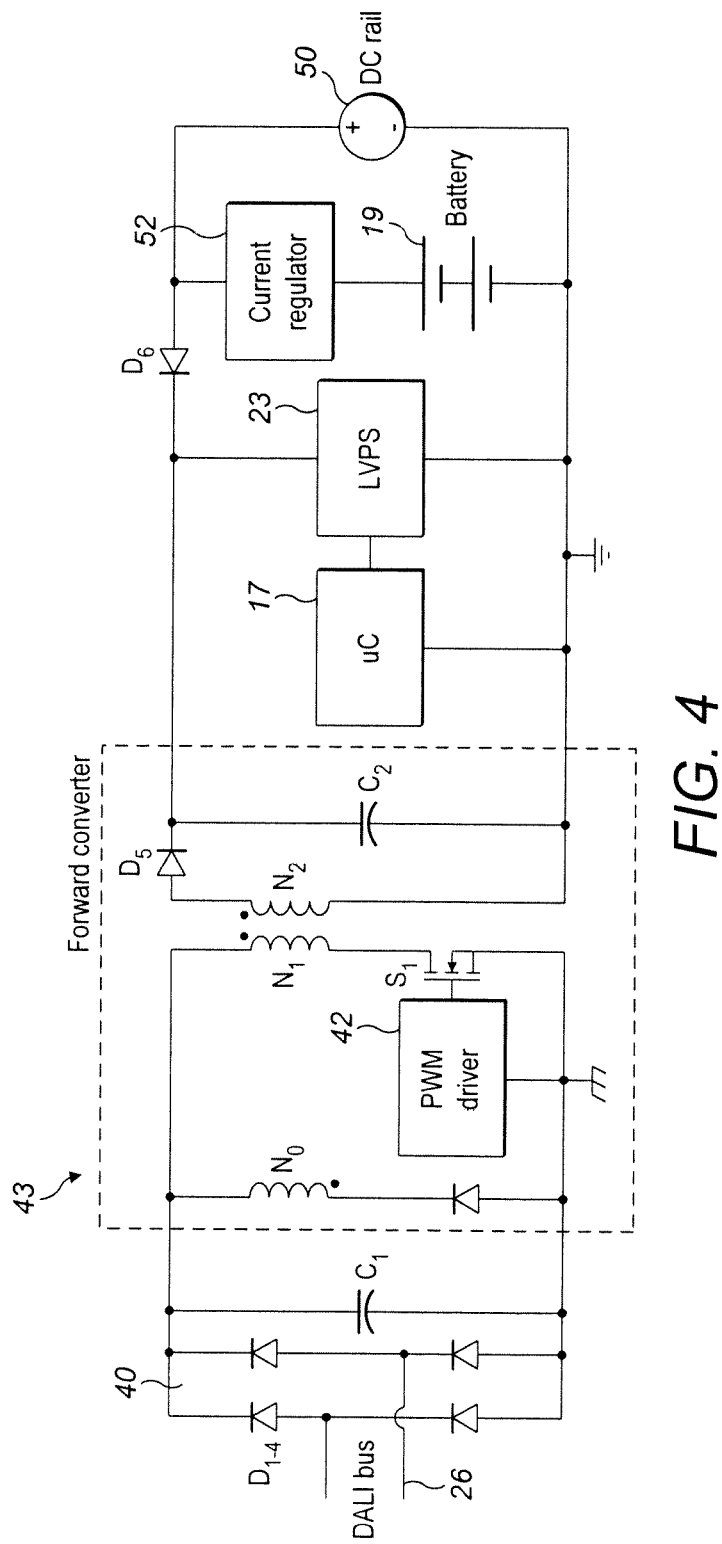

FIG. 4 also shows the LVPS implementation with an inductor-less forward converter but changes the representation of the battery charging. The difference between FIGS. 3 and 4 is the connection of the battery 19. Whereas in FIG. 4 a linear regulator 52 is used for interruption and control of the battery current, in FIG. 3 a switched system is used (regulation of the current can be done by high frequency switching of switch 46, also a part of a switched converter).

Current control can be obtained by inserting an output inductor for the forward converter, but may not be required as there may not need to regulate the voltage in the input of the controller LVPS 23.

Figure 5:
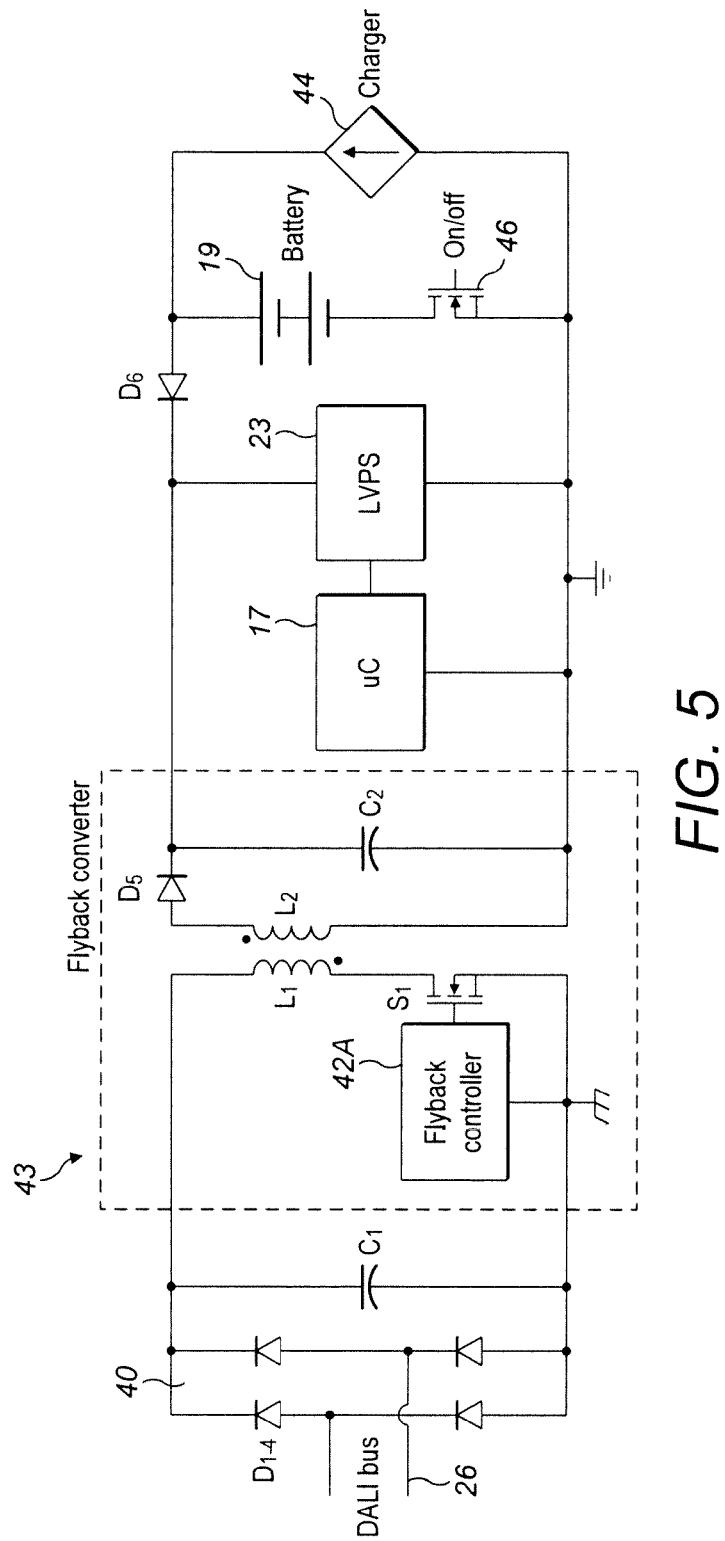
Figure 6:
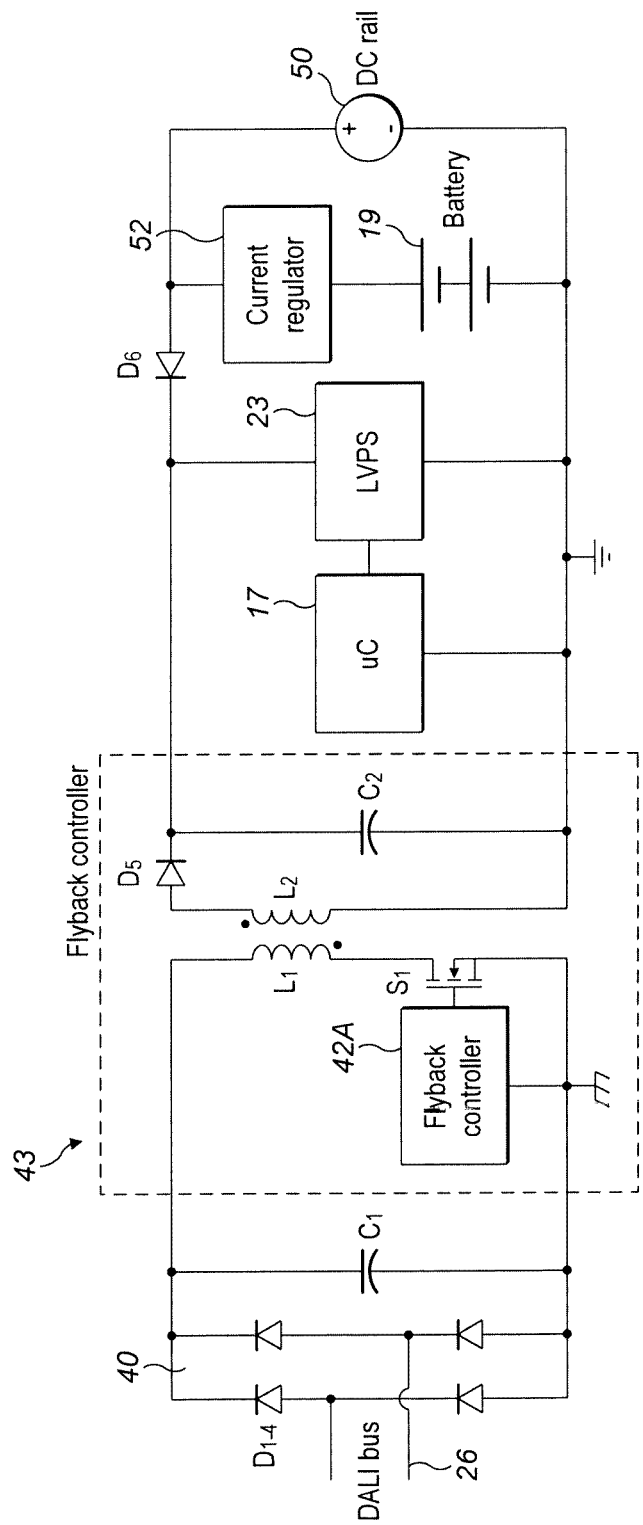

An alternative to the FIGS. 3 and 4 arrangements is to use a flyback converter, as shown in FIGS. 5 and 6, where current regulation can be obtained just with the transformer, but not voltage regulation. A simple PWM IC with feed-back is able to perform such voltage regulation easily either from the secondary winding $L_{S2}$ via an opto-coupler or from primary winding $L_P$ by sensing the reflected voltage in the transformer T. (Both flyback and forward can be implemented with primary or secondary control. The microcontroller and/or an opto-coupler are able to perform secondary control.)

The isolated off-DALI LVPS auxiliary converter circuit of FIG. 5 is connected on the input side to the DALI bus 26 via bridge rectifier 40, across which capacitor $C_1$ is connected in order to provide power. The circuit includes a control unit 42A, the isolated DC-DC converter 43 and the battery 19.

The auxiliary converter 43 is constituted, in this example, by a so-called flyback converter which exhibits, on the one hand, a transformer T with a primary winding $L_P$ and a secondary winding $L_{S2}$ and also, on the other hand, a controllable switch S1. In known manner, by an appropriate alternating opening and closing of the switch S1 the energy made available by the DALI bus 26 is transmitted to the secondary side of the flyback converter 43 and utilised for the purpose of powering the controller supply 23. The transmission of energy takes place in the open state of the switch S1, wherein for this purpose a diode $D_5$ is furthermore provided on the output side of the flyback converter 43. Flyback circuits of such a type often find application in emergency lighting devices of such a type by reason of their simple structure and their reliable functioning.

Triggering of the controllable switch S1 is undertaken by the control unit 42A. In this connection the control unit 42A controls the switch S1 in alternating manner, the so-called duty cycle D1 for the switching operation of the switch S1 being calculated as follows:

$$D1 = t_{on1}/(T - t_{on1})$$

where $t_{on1}$ corresponds to the on-time of the switch, whereas T denotes the total period of a complete switching cycle for the switch S1.

In this way, the auxiliary converter 43 can provide power to the controller supply 23 from the DALI bus 26 in order to provide power to the controller 17. As shown in FIG. 5, the controller supply 23 is also coupled to the battery 19 via diode D6 (which is charged by charger rail 44 of the battery charger 21 when AC mains power is available).

FIG. 6 shows an arrangement similar to that of FIG. 5 but showing the battery 19 connected to the DC rail 50 of the converter 11 via a (linear) current regulator 52.

FIGS. 3 to 6 show examples of auxiliary converter types. Other auxiliary converter types are also applicable to the invention, such as half-bridge, full-bridge, push-pull, SEPIC, Cuk, Zeta, etc. Preferably the auxiliary converter is an isolated converter to provide (galvanic) isolation of the interface 25 and bus 26 from the rest of the lighting system 1. Also, preferably the auxiliary converter provides primary and/or secondary control (regulation) of voltage and/or current. The regulation may be performed by an opto-transistor and/or by the controller 17 and/or by a PWM chip (42, 42A) or any discrete or integrated circuit.

The auxiliary converter can optionally be integrated into the DALI interface 25 which is used for communication of the controller 17 with the bus 26. This may be for instance the case where a transformer is used for transmission of the data from and to the bus 26. Such transformer may be switched with high frequency and may have several output windings which may be used for out coupling of data and/or power.

The invention claimed is:

1. A lighting system power supply arrangement comprising a mains input converter operable to provide power and is operable to charge an energy storage device, a controller operable to control at least one element of the lighting system, a controller bus and a controller interface operable to provide control signals from the bus to the lighting system, and an isolated DC-DC auxiliary converter operable to power the lighting system from the bus, wherein the controller bus carries power for the purpose of conveying the control signals, and wherein the auxiliary converter is operable to use said power to power the controller from the bus and is operable to power the lighting system when the mains input is outside normal operating values.

2. The lighting system of claim 1, wherein the mains input converter is operable to power a lamp.

3. The lighting system of claim 1, wherein the mains input converter is operable to power the controller.

4. The lighting system of claim 1, wherein one of the elements controlled by the controller is a lamp.

5. The lighting system of claim 4, wherein the controller is operable to control the operation of the lamp in dependence upon a detected status of the mains input.

6. The lighting system of claim 1, wherein the controller is operable to control operation of the lamp in dependence upon the control signals received from a central controller via the controller bus.

7. The lighting system of claim 1, wherein the controller bus is a DALI bus and the controller interface is a DALI interface.

8. The lighting system of claim 1, wherein the controller bus is powered independently of the mains input.

9. A lighting system power supply method for a lighting system comprising a mains input converter for providing power and for charging an energy storage device, a controller for controlling at least one element of the lighting system, a controller bus and a controller interface for providing control signals from the bus to the controller, the method comprising: using an isolated DC-DC auxiliary converter to power the lighting system from the bus, wherein the controller bus carries power for the purpose of conveying the control signals, and wherein the auxiliary converter uses said power to power the controller from the bus and to power the lighting system when the mains input is outside normal operating values.

10. The method of claim 9, wherein the mains input converter powers a lamp.

11. The method of claim 9, wherein the mains input converter powers the controller.

12. The method of claim 9, wherein one of the elements controlled by the controller is a lamp.

13. The method of claim 12, wherein the controller controls the operation of the lamp in dependence upon a detected status of the mains input.

14. The method of claim 9, wherein the controller controls operation of the lamp in dependence upon the control signals received from a central controller via the controller bus.

15. The method of claim 9, wherein the controller bus is a DALI bus and the controller interface is a DALI interface.

16. The method of claim 9, wherein the controller bus is powered independently of the mains input.

\* \* \* \* \*